July 2, 1940.  W. T. LEVITT  2,206,816
SIDE ARM EQUIPPED GLASSWARE
Filed Sept. 13, 1937  2 Sheets-Sheet 1
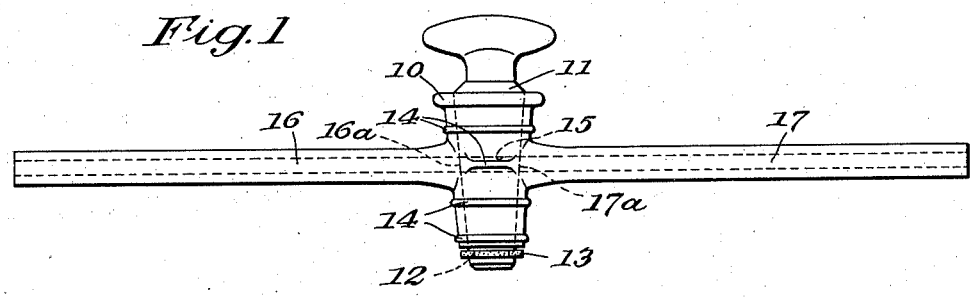
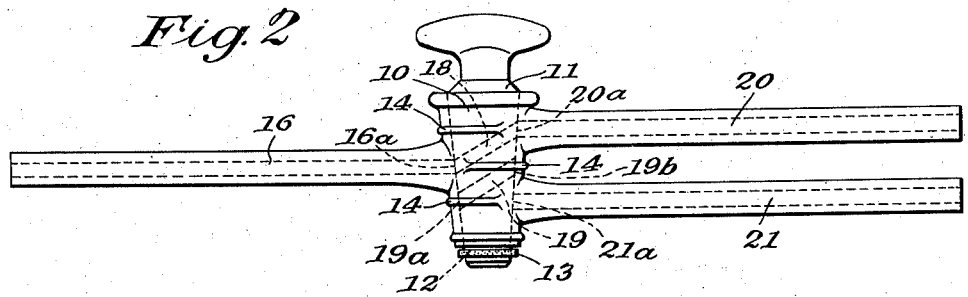
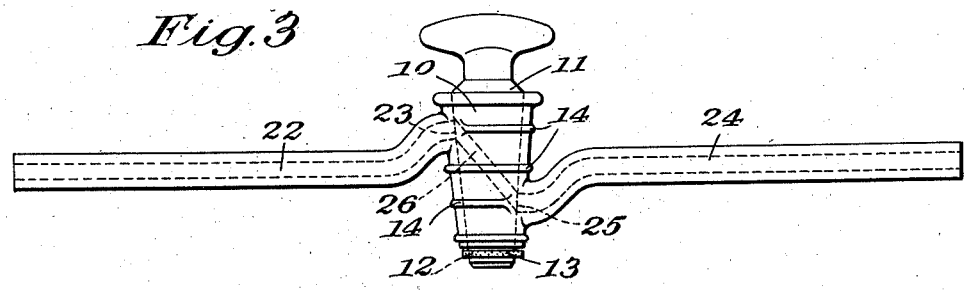
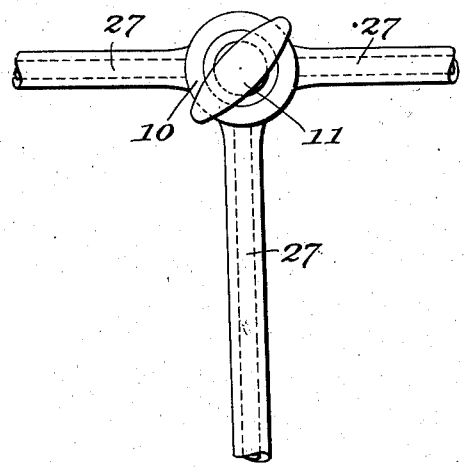
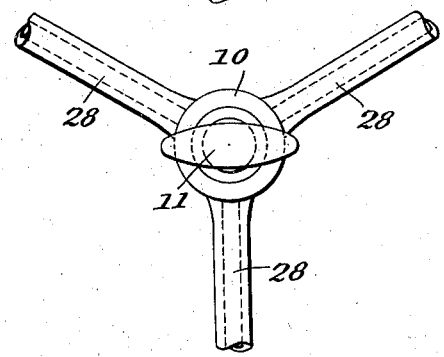
INVENTOR
William T. Levitt
BY Spear, Rawlings & Spear.
ATTORNEYS.

July 2, 1940.   W. T. LEVITT   2,206,816
SIDE ARM EQUIPPED GLASSWARE
Filed Sept. 13, 1937   2 Sheets-Sheet 2
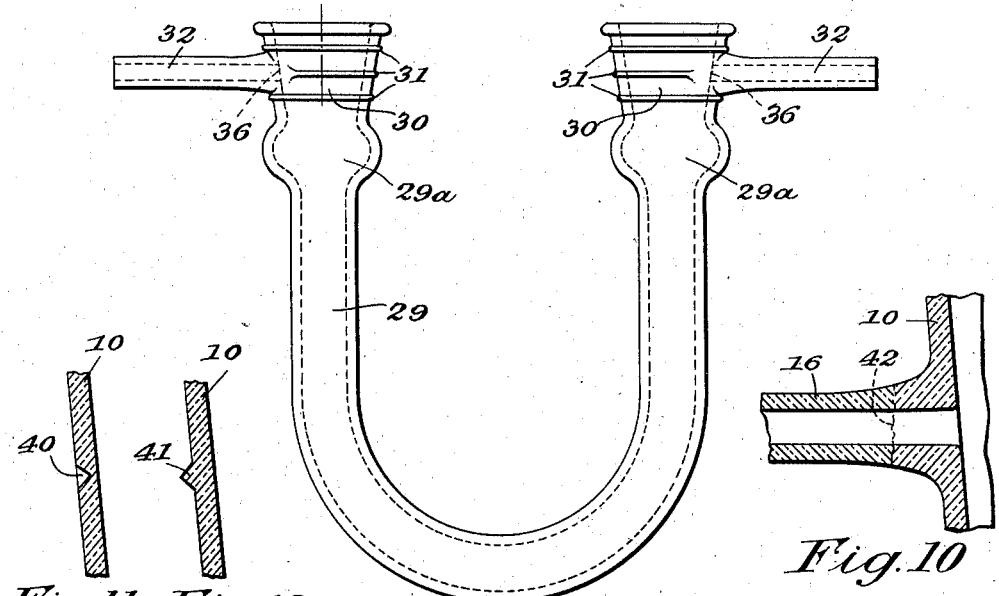
INVENTOR.
William T. Levitt
BY Spear, Rawlings & Spear,
ATTORNEYS.

Patented July 2, 1940

2,206,816

UNITED STATES PATENT OFFICE 2,206,816

SIDE ARM EQUIPPED GLASSWARE

William T. Levitt, Needham, Mass., assignor to Tamworth Associates, Inc., Needham, Mass., a corporation of Massachusetts Application September 13, 1937, Serial No. 163,524

5 Claims. (Cl. 49—82)

This invention relates to glassware for laboratory and industrial work, and more particularly to side arm equipped ground glass joints, stop cocks, and the like.

The problem in the art has been to accurately attach the side arm or arms on the female cone of a ground glass joint or the shell of a stop cock, so that the bore of the side arm will be perfectly aligned with the opening in the male cone of the ground glass joint or the bore in the plug of the stop cock.

Heretofore the glass blower has had to rely entirely on his own skill and judgment in selecting the proper point on the female cone or shell at which to fuse the side arm. This has frequently resulted in imperfectly locating the side arm with consequent failure of the opening or bore in the male cone or plug to exactly register with the bore of the side arm.

Heretofore, moreover, the male and female cones of the ground glass joint or the shell and plug of a stop cock have usually been individual grindings. Consequently, when one of the parts became broken it was necessary to remove the complemental part from the apparatus line and return it to the manufacturer in order that a new part might be ground to fit the returned part.

With the adoption of a recognized commercial standard (see Bulletin of the U. S. Dept. of Commerce, No. CS 21–36 of May 15, 1936) for standard tapered interchangeable ground glass joints, stop cocks and stoppers, it has become increasingly important that the female cone of a ground glass joint or the shell of a stop cock be provided with some means for accurately locating the point of attachment of the side arm thereto so that replacement parts may be ordered by catalog number from the manufacturer with every assurance that the replacement part will properly fit the complemental part of the joint or stop cock.

Another advantage is that the manufacturer may grind at one time and carry in stock a definite quantity of female cones or shells of various size, taper and side arm arrangement, together with an adequate supply of male cones or plugs of the complemental size, taper and opening or bore arrangement, thus effecting a worth-while saving in manufacturing costs.

According to my invention I provide the female cone of a ground glass joint or the shell of a stop cock, preferably during manufacture thereof, with predetermined markings by means of which the glass blower may locate the side arm or arms thereon so that when such side arm or arms are fused in place the bore thereof will exactly align with the hole or bore in the complemental male cone or plug.

Such locating marks are permanent and may take any desired form. For example, they may be a spaced series of circumferential rings formed integrally with the female cone or shell at predetermined intervals between the ends thereof.

Where formed as rings, such rings may be either protuberances or indentations, and may completely or only partially encircle the cone or shell.

Or, if desired, the locating marks of whatever form or nature may be sandblasted or otherwise permanently etched in the female cone or shell without the necessity of deforming in any way the cone or shell itself.

I prefer, however, to form the locating marks as annular protuberances because such rings not only strengthen and make more rugged the female cone or shell, but impart to it a distinctive design or appearance which immediately identifies the ware as ware of my manufacture.

Regardless, however, of the physical form which these permanent markings may take, once applied to the female cone or shell they become predetermined locating points for the attachment of the side arm or arms, which in accordance with conventional practice are fused in place by first heating the female cone or shell to "pull" a hole or holes in the wall thereof at the exact point or points where the side arm or arms are to be attached and thereafter fusing the side arm or arms into such hole or holes.

Thus the glass blower is relieved of the necessity of depending upon the judgment of his eye alone as to the point on the female cone or shell at which to locate the side arm. Instead, by "pulling" the hole at or between a definite marking or markings and there attaching the side arm, he can be assured that the hole in the male cone or plug when ground will accurately register with the bore of the side arm.

In the drawings:

Figs. 1 to 5 inclusive show several of the many possible side arm arrangements for conventional stop cocks, the shells of the stop cocks being provided with predetermined locating marks in accordance with my invention.

Fig. 6 shows a standard taper interchangeable ground joint, the female cones of which are provided with locating marks in accordance with my invention for the attachment of the side arms.

Figs. 7, 8 and 9 are elevations of female cones or shells showing several of the many possible methods of applying the locating marks thereto.

Fig. 10 is a sectional detail particularly illustrating the manner in which a locating mark, when formed as a protuberance from which the hole is "pulled," merges with the side arm when the same is fused thereto, and Figs. 11 and 12 are sectional details showing, respectively, locating marks of the indented and protuberance type.

The principles of my invention are applicable to a wide variety of side arm equipped articles of glassware for surgical, scientific, laboratory or industrial work. Stop cocks and articles having standard taper ground joints, such as bottles, flasks and tubes sufficiently suggest the many possible uses.

In Figs. 1 to 5, inclusive, I have shown conventional stop cocks with several different side arm arrangements. In all of these views the shell and plug of a conventional stop cock are designated 10 and 11, respectively, the shell being provided at its lower end with the usual shouldered recess 12 for the reception of the usual rubber or other washer 13 commonly employed to prevent the plug from falling by gravity out of the shell when the stop cock is inverted.

In Fig. 6 I have shown a U-tube 29 having standard taper ground joints comprising female cones 30 and male cones 33.

Referring to Figs. 1 to 5, inclusive, the shell 10 between its ends is provided with a vertically spaced series of circumferential rings 14. These rings constitute permanent locating marks for the attachment of the side arm or arms as well as contributing to the ruggedness of the shell. These rings may be equidistantly spaced or not, as desired.

In Fig. 1 the stop cock has two oppositely disposed tubular side arms 16 and 17. These are fused to opposite sides of the shell within the zone of the locating rings 14. As shown, the side arms are co-planar and fused to opposite sides of the shell at one of the rings 14.

In attaching the side arms such ring indicates to the glass blower the exact points between the shell ends at which the holes 16a and 17a are to be "pulled" in the shell wall so that when the side arms are fused thereto the bores of the side arms will exactly coincide with the bore 15 of the plug 11. In this action the material of the selected locating ring 14 merges with the side arms, as diagrammatically indicated by the broken line 42, in Fig. 10.

In Fig. 2 the stop cock is provided at one side thereof with a single side arm 16 and at the opposite side thereof with a superposed pair of side arms 20 and 21, the "pulled" holes for said arms being designated at 16a, 20a and 21a, respectively. The plug 11 of the stop cock is provided with two diagonal bores 18 and 19. When the plug is in the position of Fig. 2, the bore 18 places the arms 16 and 20 in communication with each other. When the plug is rotated 180° in the shell the bore 19 places the arms 16 and 21 in communication with each other.

In Fig. 3 the side arms 22 and 24 are disposed at opposite sides of the stop cock but at different levels the "pulled" holes for said arms being designated at 23 and 25, respectively. The plug 11 has a diagonal bore 26 which places said side arms in communication with each other.

In Figs. 4 and 5, the stop cock is equipped with three angularly spaced side arms. In Fig. 4, the side arms 27 are disposed at right angles to each other with two of them extending in the same direction. In Fig. 5 the side arms 28 all extend in different angular directions from the shell.

In Fig. 6, the side arms 32 are attached in the "pulled" holes 36 of the ground glass female cones 30 of the U tube 29 within the zone of the locating rings 31. The ground glass male cone 33 is hollow, as indicated at 34 and is provided with a lateral hole 35 which registers exactly with the bore of a side arm 32 when inserted in a female cone 30.

In the modification of Fig. 7, the locating marks are applied to the hollow member 10, which may be considered either as the shell of the stop cock or the female cone 30 of the ground glass joint, as circumferential indentations 37.

In Fig. 8 the locating marks are circumferential, but are disposed as laterally spaced protuberances 38.

In Fig. 9 they are sandblasted, etched or otherwise applied to the member 10 as surface dots or spots 39.

In Fig. 11 the spots or dots 40 are indented and in Fig. 12 they extend as protuberances 41.

In all forms, the locating marks, however applied, establish between the ends of the member 10 a definitely delimited zone for the attachment of the side arm as well as accurate guides or markers for the precise location of the side arms within such zones.

In the appended claims the term "female cone" is used in its inclusive sense to designate either the female cone 30 of a ground glass joint or the shell 10 of a stop cock, and term "male cone" is likewise used in its inclusive sense to designate either the male cone 33 of the ground glass joint or the plug of the stop cock.

What I therefore claim and desire to secure by Letters Patent is:

1. In the manufacture of side arm equipped vitreous ware, the method of attaching the side arm to the female member of such articles as stop cocks or the like at the precise point at which the bore of said side arm will substantially exactly coincide with the bore or opening in the complemental male member, comprising forming the female member and simultaneously forming therein a series of integral formations on its side wall at spaced distances from the ends thereof, heating the female member and pulling an opening therein adjacent the selected formation, and fusing a side arm to the female member about said pulled opening.

2. As a new article of manufacture, a molded hollow female member of a stopcock, joint or like article of vitreous ware adapted to be equipped with a tubular side arm, said member having a series of spaced locating formations formed integrally with the side wall thereof and positioned to mark the point on the side wall at which a side arm when fused to said member will have its bore substantially coinciding with the bore or opening in the complemental male member of the stopcock.

3. The article of claim 2, in which the locating formations extend as circumferential protuberances about the female member.

4. The article of claim 2, in which the locating formations extend as circumferential indentations about the female member.

5. The article of claim 2, in which the locating formations extend in circumferential rows about the female member and all formations in each circumferential row are spaced laterally from each other.

WILLIAM T. LEVITT.